(12) United States Patent
Horie et al.

(10) Patent No.: US 10,366,046 B2
(45) Date of Patent: *Jul. 30, 2019

(54) REMOTE DIRECT MEMORY ACCESS-BASED METHOD OF TRANSFERRING ARRAYS OF OBJECTS INCLUDING GARBAGE DATA

(71) Applicant: INTERNATIONAL BUSINESS MACHINES CORPORATION, Armonk, NY (US)

(72) Inventors: Michihiro Horie, Saitama (JP); Kiyokuni Kawachiya, Kanagawa (JP); Mikio Takeuchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,215

(22) Filed: May 15, 2018

(65) Prior Publication Data

US 2018/0260359 A1 Sep. 13, 2018

Related U.S. Application Data

(63) Continuation of application No. 15/045,869, filed on Feb. 17, 2016, now Pat. No. 10,031,886.

(51) Int. Cl.
*G06F 15/167* (2006.01)
*G06F 15/173* (2006.01)
(Continued)

(52) U.S. Cl.
CPC ........ *G06F 15/17331* (2013.01); *G06F 3/065* (2013.01); *G06F 3/067* (2013.01);
(Continued)

(58) Field of Classification Search
USPC .................. 709/212, 213, 214, 215, 221
See application file for complete search history.

(56) References Cited

U.S. PATENT DOCUMENTS 8,176,187 B2 5/2012 Hufferd
8,244,825 B2 8/2012 Subramanian et al.
(Continued)

OTHER PUBLICATIONS

List of IBM Patents or Patent Applications Treated as Related dated May 15, 2018, 2 pages.
(Continued)

*Primary Examiner* — Lan Dai T Truong
(74) *Attorney, Agent, or Firm* — Tutunjian & Bitetto, P.C.; Vazken Alexanian

(57) ABSTRACT

A method for copying and transferring data by remote data memory access resulting in faster data transfer speeds is provided. The method includes determining an amount of garbage data of data information, and comparing the amount of garbage data to a threshold amount. In response to the amount of garbage data being below the threshold amount, a first portion of data that includes intended data of the data information and the garbage data is copied to a remote place. In response to the amount of garbage data exceeding threshold amount, a second portion of data that includes only the intended data is copied to the remote place by a scatter/gather input/output method of a remote data memory access protocol. The copied data is returned to a free list of the remote place.

20 Claims, 9 Drawing Sheets

(51) Int. Cl.
*G06F 3/06* (2006.01)
*G06F 12/02* (2006.01)

(52) U.S. Cl.
CPC ........ *G06F 3/0619* (2013.01); *G06F 12/0253* (2013.01); *G06F 2212/702* (2013.01)

(56) References Cited

U.S. PATENT DOCUMENTS

| | | |
|---|---|---|
| 8,583,755 B2 | 11/2013 | Hefty et al. |
| 8,909,727 B2 | 12/2014 | Frey et al. |
| 2007/0041383 A1 | 2/2007 | Banikazemi |

OTHER PUBLICATIONS

Wang, Hao et al, GPU-Aware MPI on RDMA-Enabled Clusters: Design, Implementation and Evaluation, IEEE Transactions on Parallel and Distributed Systems, vol. 25, No. 10, Oct. 2014. (pp. 2595-2605).

REMOTE DIRECT MEMORY ACCESS-BASED METHOD OF TRANSFERRING ARRAYS OF OBJECTS INCLUDING GARBAGE DATA

BACKGROUND

Technical Field

The present invention relates to the copy and transfer of data by remote direct memory access (RDMA), particularly to the copy and transfer of data that has non-contiguous data regions that include garbage data.

Description of the Related Art

In the X10 programming language (hereinafter "X10"), an X10 "place" is a repository for data and activities, corresponding loosely to a process or a processor. A place may be local and a place may be remote. The activities running in a place may access data items located at a local place with the efficiency of on-chip access. On the other hand, accessing data stored in other places may take orders of magnitude longer.

In X10, objects cannot be referred to directly if they are found at other places, e.g., remote places. Instead, when a remote place needs to use an object, the object is copied from where it is stored, e.g., a local place, for use in the remote place.

In computing, remote direct memory access (RDMA) is a direct memory access from the memory of one computer into that of another computer without involving the operating system of either computer. Memory access via RDMA attains high throughput and networking with low latency. These features are especially useful in very large parallel computer clusters. With RDMA, the cost of data transfer can be reduced.

Vectored input/output (I/O), also known as scatter/gather I/O, is a method of input and output by which a single procedure-call sequentially writes data from multiple buffers to a single data stream or reads data from a data stream to multiple buffers. The buffers are given in a vector of buffers. Scatter/gather I/O refers to the process of gathering data from, or scattering data into, the given set of buffers. Scatter/gather I/O can operate synchronously or asynchronously. Using scatter/gather I/O with RDMA could be efficient and convenient; however, when scatter/gather I/O is frequently used, the computer system may experience significant degradation due to the creation of additional data copies during scatter/gather operations.

SUMMARY

According to present principles, described herein is a computer-implemented method of copying and transferring arrays of data by remote data memory access. In the method, data information in data arrays in a local place is identified. The addresses and sizes of the data information are determined. The contents of the data information are classified as intended data and as garbage data, and the amount of garbage data is determined and compared to a threshold garbage data criteria amount. When the amount of garbage data is below the threshold garbage data criteria amount, a contiguous portion of the data that includes intended data and garbage data is copied to a remote place. When the amount of garbage data is above the threshold garbage data criteria amount, a portion of the data that includes only intended data is copied to the remote place by a scatter/gather input/output procedure of a remote data memory access protocol. Garbage data that has been transferred to the remote place is returned to a free list of the remote place. Computer performance is improved by the computer-implemented method.

Further in accordance with the present principles, described is a system for transferring arrays of data objects by remote data memory access. The system includes one or more processors including memory that process and stores a quantity of data to be copied and transferred from a local place to a remote place. The system has an address mapping module that maps the addresses and locations of data to be copied from the local place to the remote place. To determine the amount of garbage data located among the data to be copied, a data array size determiner is included in the system. A scatter/gather data copy/transfer unit is provided to copy and transfer only intended data to the remote place when the data array size determiner determines that the amount of garbage data exceeds a threshold value. A contiguous data copy/transfer unit is provided to copy and transfer a contiguous portion of data including intended data and garbage data to the remote place when the data array size determiner determines that the amount of garbage data is lower than a threshold value. A memory array deallocator is included to return garbage data to a free list of the remote place after garbage data has been copied to the remote place.

Still further in accordance with the present principles, described is computer program product of transferring arrays of data by remote data memory access, the computer program product comprising a non-transitory computer readable storage medium having program instructions embodied therewith, the program instructions being executable by a computer to cause the computer to perform a method in which data information in data arrays in a local place is identified. The addresses and sizes of the data information are determined. The contents of the data information are classified as intended data and as garbage data, and the amount of garbage data is determined and compared to a threshold garbage data criteria amount. When the amount of garbage data is below the threshold garbage data criteria amount, a contiguous portion of the data that includes intended data and garbage data is copied to a remote place. When the amount of garbage data is above the threshold garbage data criteria amount, a portion of the data that includes only intended data is copied to the remote place by a scatter/gather input/output procedure of a remote data memory access protocol. Garbage data that has been transferred to the remote place is returned to a free list of the remote place.

Still further in accordance with the present principles, described is a computer-implemented method for transferring data by remote data memory access resulting in faster data transfer speeds. In the method, an amount of garbage data of data information is determined, and the amount of garbage data is compared to a threshold amount. In response to the amount of garbage data being below the threshold amount, a first portion of data that includes intended data of the data information and the garbage data is copied to a remote place. In response to the amount of garbage data exceeding threshold amount, a second portion of data that includes only the intended data is copied to the remote place by a scatter/gather input/output method of a remote data memory access protocol. The copied data is returned to a free list of the remote place. At least a portion of the steps of the method are implemented by a hardware processor.

Still in further accordance with the present principles, described is a system for transferring data by remote data memory access resulting in faster data transfer speeds. The system includes one or more processors operatively coupled to a memory including program code to: determine an amount of garbage data of data information in a selected data portion, and compare the amount of garbage data to a threshold amount; in response to the amount of garbage data being below the threshold amount, copy a first portion that includes intended data of the data information and the garbage data to a remote place; in response to the amount of garbage data exceeding the threshold amount, copy a second portion that includes only the intended data to the remote place by a scatter/gather input/output method of a remote data memory access protocol; and return the copied data to the remote place to a free list of the remote place.

Still further in accordance with the present principles, described is computer program product for transferring data by remote data memory access resulting in faster data transfer speeds, the computer program product comprising a non-transitory computer readable storage medium having program instructions embodied therewith, the program instructions being executable by a computer to cause the computer to perform a method. The method includes: determining an amount of garbage data of data information in a selected data portion, and comparing the amount of garbage data to a threshold amount; in response to the amount of garbage data being below the threshold amount, copying a first portion of data that includes intended data of the data information and the garbage data to a remote place; in response to the amount of garbage data exceeding the threshold amount, copying a second portion of data that includes only the intended data to the remote place by a scatter/gather input/output method of a remote data memory access protocol; and returning the copied data to a free list of the remote place.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

According to present principles, described is a system and method for the transfer of data by remote direct memory access (RDMA), particularly to transfer of data that contains non-contiguous data regions that include garbage data.

As indicated, RDMA bypasses the operating systems of the computer environments involved in the transfer of data (e.g., the local and remote places), which may advantageously decrease the workload on the processors and networks of a computing environment. RDMA implements a transport protocol in the network interface card (NIC) hardware and supports a feature called zero-copy networking. Zero-copy networking makes it possible to read data directly from the main memory of one computer and write that data directly to the main memory of the other computer. By enabling one network node to directly place information in another network node's memory with minimal demands on memory bus bandwidth and processor overhead, RDMA operations can attain high throughput and with low network latency. RDMA has proven useful in applications that involve high-speed clusters and data center networks.

The at statement in X10 allows for copying of objects. For example, for the statement "at(p) {S}", the data that is defined outside of at and that is used in S (that is, to execute S) is copied to a remote place p. An activity executing "at(p) {S}" suspends execution in the current place. The object graph G at the current place whose roots are all the variables V used in S is serialized, and transmitted to place p, and deserialized (creating a graph G' isomorphic to G). An environment is created with the variables V bound to the corresponding roots in G', and S executed at p in this environment. On local termination of S, computation resumes after "at(p) {S}" in the original location. Because of this ability to shift the current place, at is said to be a place-shifting operation. The at instruction is the only control construct related to places in X10.

The data just before the at body is executed is copied to a remote place. To realize this feature, when the X10 compiler converts X10 code to Java/C++ code, at is converted to a method invocation of runAt, and the data that will be copied to a remote place is given as the arguments of the runAt method. An async spawns a new thread of control that operates asynchronously with other threads. An async may use an atomic operation to execute a set of operations on cells located in the current place, as if in a single step. It may use the at operation to switch the place of execution.

Figure 1:
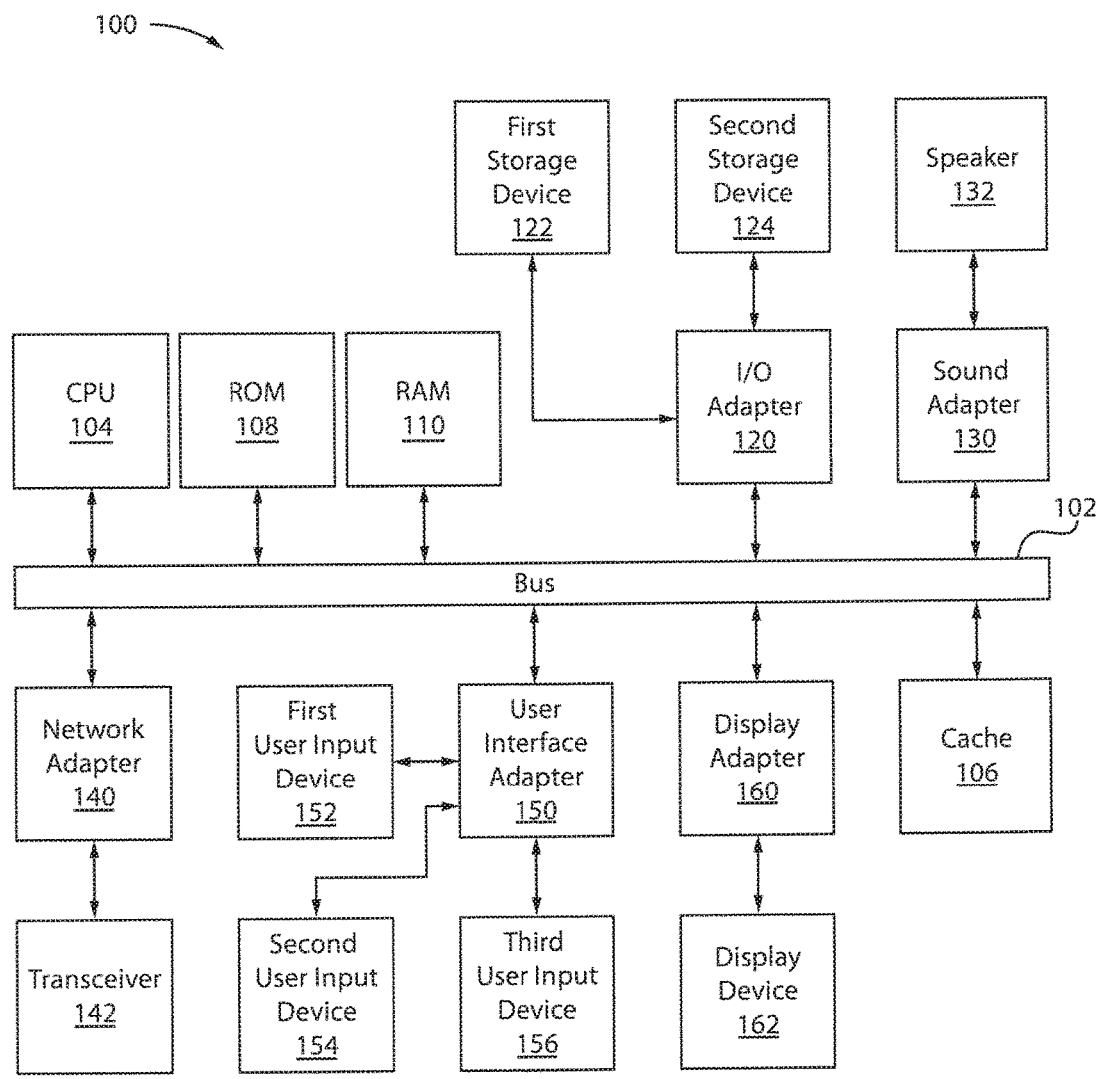
FIG. 1 shows an exemplary processing system to which the present principles may be applied.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
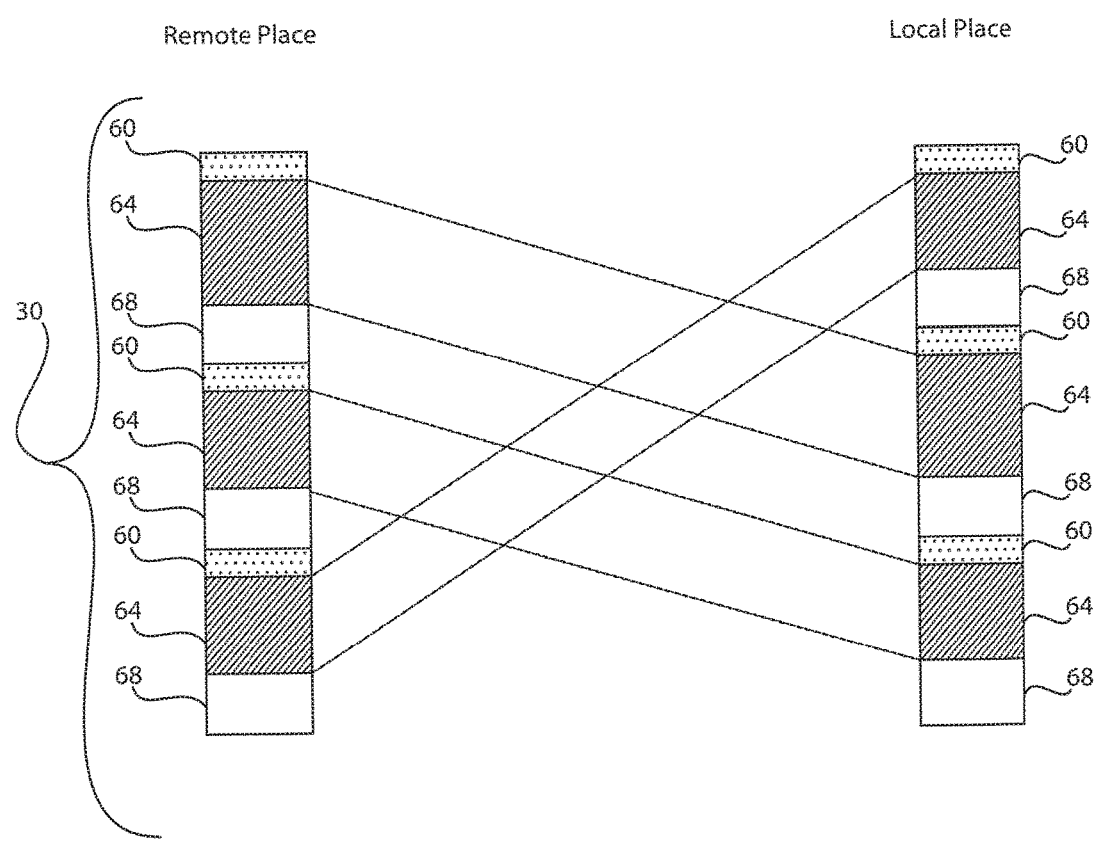
FIG. 2 shows a configuration of a local place and a remote place between which data is transferred by RDMA in accordance with one embodiment of the present principles.

According to an embodiment of the present principles depicted in FIG. 2, data populating a list (list<addr, size>) 30 is transferred by from a local place to a remote place through the RDMA protocol. The object data, identified by the shaded regions 64 having headers 60, is that that of size1 associated with header addr1, size2 associated with header addr2, and size3 associated with header addr3. Between the regions are unlabeled data blocks 68, which represents unintended data that does not have to be sent because it is not intended for use by the remote place. The unintended data 30 is garbage data. The array of list 30 is transferred non-contiguously, e.g., employing the scatter/gather feature of the RDMA protocol.

In the C++ backend of an X10 compiler, an array of a fixed size with scalar data such as Rail[Int] and Rail[Long] may be copied using RDMA utilizing the application program interface (API) function "Rail.asyncCopy( )". Since it is not known whether the memory allocation is contiguous or non-contiguous in the physical memory, it is possible that the array is copied using RDMA scatter/gather procedure. This is would the case even when an allocated array is a fixed size and is contiguous in the logical memory.

When sending an array of a fixed size with an object data type such as Rail[Any], the X10 compiler serializes each element of the array before sending the data to a remote place. Thus, for each array element of the array, only the intended data is extracted from the element and the extracted data is written into the byte stream by scatter/gather. In the remote host that receives transferred data, each element of the array is reconstructed from the byte stream in a deserialization step.

X10 does not have an application program interface (API) that copies the array of a fixed size with object types via RDMA. Since the object data often includes references pointing to other data such as other objects and class pointers, the copied and transferred data cannot be used in the remote place because the references contained in the object type are not usable in the remote place. Such data is garbage data. If, in the remote place, there is an attempt to use the transferred data in its transferred form, the program may crash, for example, a crash manifested in a segmentation fault, because of an incorrect reference. Therefore, packing the just-needed array data and sending it via RDMA may be straightforward but the preparation for same is very time-consuming.

The advantage of scatter/gather is that it enables the transfer of non-contiguous data. Data may be allocated non-contiguously in physical memory (remote direct memory access). Using RDMA a scatter/gather approach to copying data from a local place to remote place can be implemented. RDMA can employ the mapping table of logical and physical addresses, and also uses the list of addresses and lengths (e.g., sizes) of the data to be transferred. Throughout this description, this is referred to as the "scatter/gather list". RDMA processes list entries from the beginning of the list to its end. In one embodiment, there is a separate data transfer by RDMA for each list entry. While it would be better to store the data entries in one place as contiguous data in a physical memory, and send data just once by RDMA, this may not be a practical approach. If the scatter/gather list is long, having a large number of data entries, it will take long time to process all list entries.

According to present principles, there are instances where data is sent to a remote place by RDMA contiguously, and there are instances in which data is sent non-contiguously with scatter/gather input/output approach. A determination is made on whether data should be sent contiguously to the remote place, or whether data should be send non-contiguously. Data sent contiguously is a data segment or portion that includes intended data and unintended garbage data.

Figure 3:
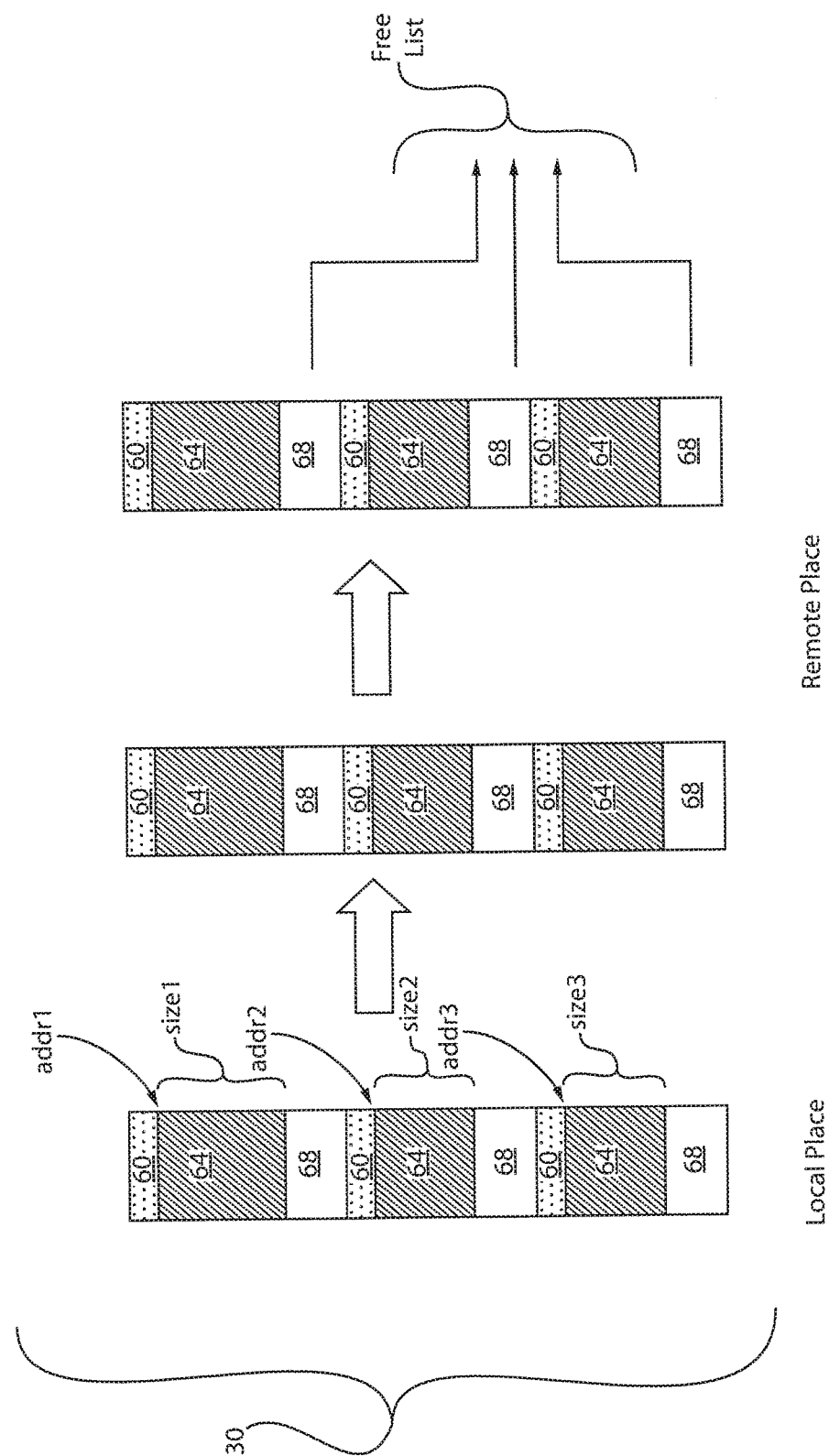
FIG. 3 shows a configuration of a local place and a remote place between which data is transferred by RDMA in accordance with one other embodiment of the present principles.

As shown in FIG. 3, a transfer of data from a list 30 in a local place (list<addr, size>) to a remote note is effected by RDMA without scatter/gather. The list includes headers 60 (addr1, addr2, addr3) of a given size, size blocks 64 (size1, size2, size3) of object data for copying and transfer, and blocks of garbage data 68. In X10, whether the data is intended data or unintended, i.e., garbage data, depends on whether the data object allocated in memory contains a reference to other data (such as another object and class). If it contains references to such other data, then the data is unintended garbage data. The reference cannot be used in that form in the remote place, as indicated above. The garbage data 68 is located between the intended data 64, e.g., between intended data in blocks 64.

The variables to be copied to the remote places are found in the local place at static compilation time by finding arrays that are defined outside at and used inside at. At runtime in the local host, the actual addresses and sizes (e.g., addr1, size1, addr2, size2, etc.) of the transferred objects for the variables are checked. The data is classified into intended data (intended for transfer) and unintended data (e.g., garbage data), and the total amount of the garbage data is determined and compared to a selected criteria. In one exemplary embodiment, the amount of garbage data is checked against a selected threshold amount, which may be a fraction or percentage of all of the data (amt. garbage data/amt. garbage data+amt. intended data). For example, the selected threshold amount may be "garbage data is less than 10% of the total amount of data transferred". In another embodiment, the selected threshold may be an absolute value, e.g., "less than 100 KB of total garbage".

In an exemplary description of the criteria, the address and size of a first intended data portion is addr1 (60) and size1 (64), and the address and size of a second intended data portion is addr2 (60) and size 2 (64), with garbage data being located between the first intended data portion and the second intended data portion, e.g., garbage is present because addr1−addr2>size1. The RDMA procedure can access the mapping table of the logical and physical addresses, and so the logical and physical addresses of the data are known. When garbage data is found to be small in size, e.g., below the threshold criteria, then the data is treated as contiguous. That is, in the above example, the first intended data portion, the intended data portion and the garbage data between them are treated as contiguous. This portion of the data will be transferred contiguously, as opposed to being transferred in a scatter/gather approach. It should be understood that the contiguous portion of the data will be added to the scatter/gather list and copied and transferred in accordance with the scatter/gather input/output (I/O) procedure of the RDMA protocol.

With this approach, the information is treated as a single scatter/gather entry, and preparing at least some contiguous data entries and entering same on the scatter/gather list should reduce the total number of entries in the scatter/gather list. The scatter/gather list is also comprised of portions of only intended data, since data that is determined to be too large to be transferred contiguously (e.g., the garbage data exceeds the selected threshold amounts) is transferred by the scatter/gather input/output approach of RDMA.

As shown in FIG. 3, after data is transferred by RDMA to the remote place, the header information is overwritten into the transferred data objects to align with the execution environment in the remote place. Pointers among the data are established in the memory layout of the remote place. Lock words, which are flags in object headers used to realize synchronization mechanisms in the multi-thread applications, are not usable in the remote place. Thus, the lock words are cleared. It may not be necessary to establish pointers in the remote place when the memory layouts of the local place and the remote place are the same.

The garbage data that has been transferred to remote place, which is not needed in that location, is deallocated from the memory of the remote place by linking the location of the garbage data to the free list at the remote place. The garbage data can then be overwritten, e.g., reallocated as needed.

Figure 4:
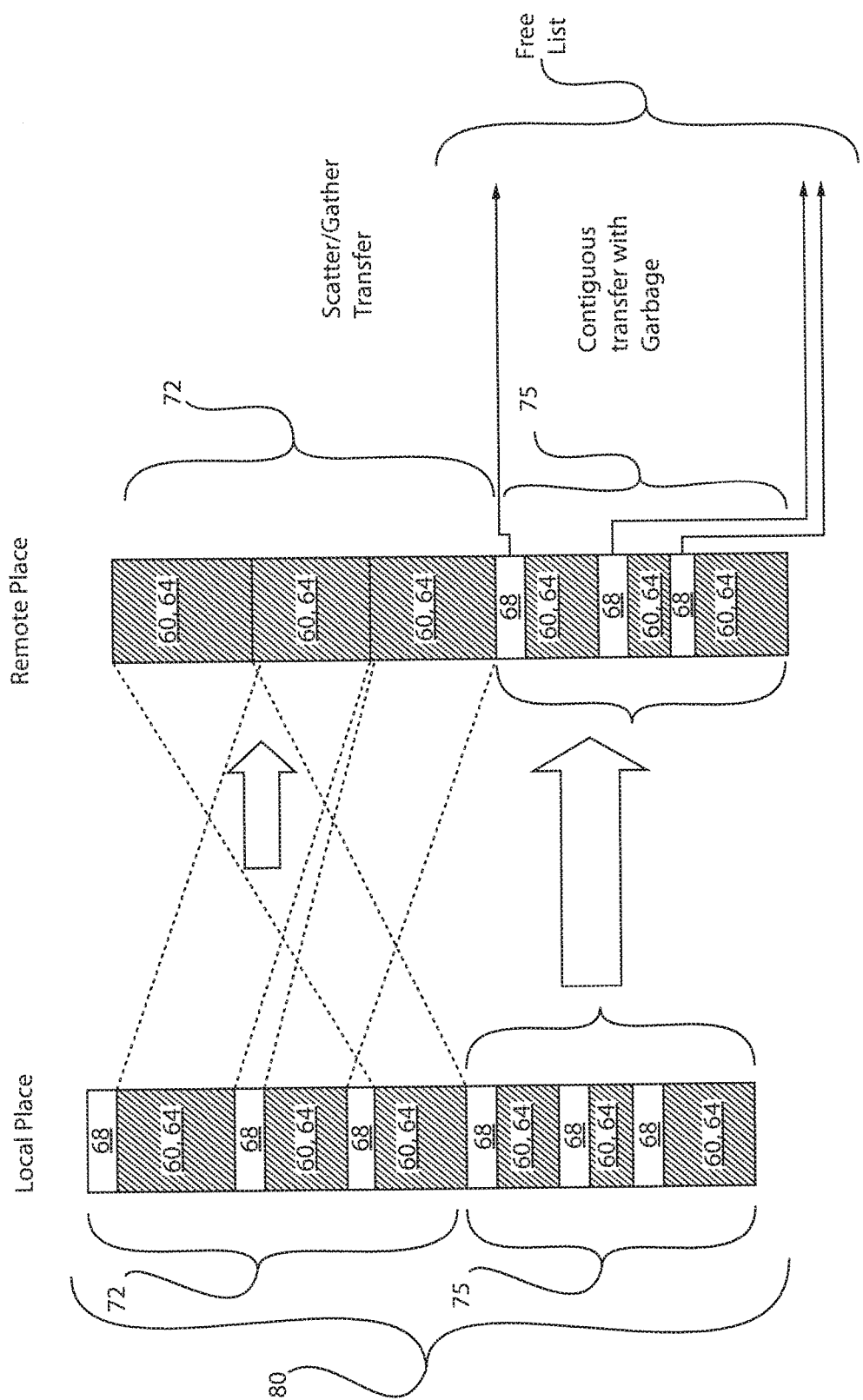
FIG. 4 shows a configuration of a local place and a remote place between which data is transferred by RDMA in accordance with yet another embodiment of the present principles.

Turning now to FIG. 4, depicted is a method of transferring contiguous arrays of objects including garbage data in combination with transferring data via RDMA using the scatter/gather input/output approach. Depicted in FIG. 4 is a local place from which an array of data 80 is copied to a remote place. There are two data regions 72 and 75 of the array in the depicted embodiment. Region 72 is an array region in which the amount of unintended garbage data is large. Region 74 is an array region in which the amount of unintended garbage data is small. By "large" amount of garbage data, it is meant that the data in region 72 has been analyzed and it has been found that the threshold criteria amount of garbage data is exceeded. In one embodiment, a large amount of data is an amount that exceeds a criteria based on a selected size, e.g., greater than 100 kb of garbage data. In another embodiment, a large amount of data is an amount of data that exceeds a selected portion of data, e.g., greater than 10% of the data in region. 72. By "small" amount of garbage data, it is meant that the data in region 75 has been analyzed and it has been found that the amount of garbage data does not exceed the threshold criteria, e.g., the thresholds identified above. These thresholds are intended to be merely exemplary. A system operator may chose other criteria, based on considerations such as system needs and performance.

The data in array region 72, where the amount of garbage is large, is copied and transferred from the local place to the remote place using the scatter/gather approach of RDMA. With this approach, only intended data is copied and transferred, and the unintended garbage data (deemed to be too large, after comparison to the threshold criteria) is left behind at the local place. Using the scatter/gather capability of RDMA makes it possible to copy and transfer data non-contiguously with only the intended data 64 being copied and transferred while leaving the garbage data 68 in the local place. RDMA uses the mapping table of logical and physical addresses, and also uses the list of addresses and lengths (e.g., sizes) of the data to be copied and transferred, creating a scatter/gather list of data to be transferred. With RDMA, data entries are listed from beginning to end.

The data in array region 75, where the amount of garbage is not large, e.g., not in excess of the threshold criteria, is copied and transferred contiguously using RDMA. Here, it has been determined that the amount of garbage data is relatively small, and for example, copying and transferring the data of region 75 contiguously would not constitute a substantial drain on the resources of the computer system. The contiguous data pieces are added to the scatter/gather list and copied and transferred by the scatter/gather input/output procedure of the RDMA protocol. By copying and transferring a portion of data contiguously, the number of entries on the scatter/gather list is lessened and the list size does not become unduly large, which can degrade system performance.

In the transfer of data, the initial sizes and addresses 60 of the data elements 64 are collected and determined. Then, the total amount of the data and the total amount of the garbage data are calculated, and it is determined whether or not the threshold criteria that controls the manner in which data is transferred, e.g., contiguous data transfer or transfer by scatter/gather of the intended data, is met. The determination is made whether a contiguous data transfer will be employed or whether pieces of only intended data will be copied and transferred.

Information about the initial sizes and addresses is forwarded to the remote place and the memory allocations are mapped out. In one embodiment, pull-type RDMA is executed to transfer data that is contiguous, e.g., data that includes garbage. In pull-type RDMA, the copying of data occurs in response to a request made by the remote side to the local side. Data is transferred by scatter/gather where the threshold criteria indicates that the amount of garbage data is large. At the remote place, the headers are created in the memory array and is filled with the data objects. By reducing the frequency at which scatter/gather processes are performed, performance degradation is avoided.

In a comparison to determine the efficacy of the embodiments in accordance with the present principles, two physical nodes were prepared to copy and transfer 1 GB of data. The PAMI API function PAMI_Send( ) was used to simulate the copying of contiguous data (in accordance with the described embodiments) and PAMI_Send_Typed( ) was used to simulate the copying of non-continuous data. In copying the non-contiguous data with PAMI_Send_Typed( ) it was found that RDMA scatter/gather operations were frequently executed. As a result, performance degradation was seen in the PAMI_Send_Typed( ) operations, when compared to sending data contiguously through PAMI_Send( ) operations. Copying and transferring data according to embodiments of the present principles in which a portion of the data is transferred contiguously by RDMA, results in a 28% reduction in the time to transfer 1 GB of data.

Figure 5:
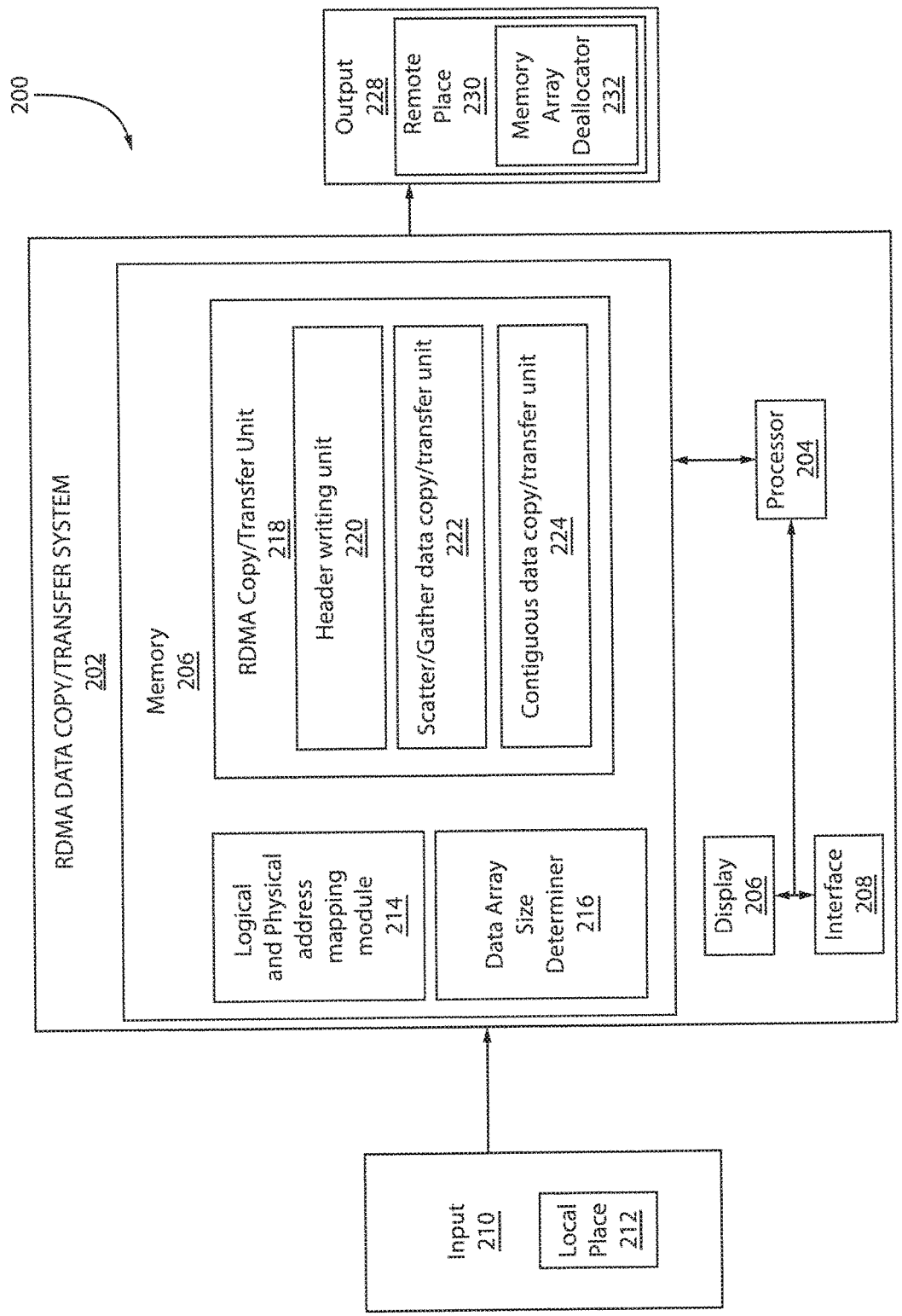
FIG. 5 shows an exemplary system for transferring data by RDMA in accordance with an embodiment of the present principles.

With reference to FIG. 5, a system 200 for the RDMA-based method of transferring arrays of objects including garbage data is depicted. The system may implement embodiments of the present principles. Part or all of processing system 100 may be implemented in one or more of the elements of system 200.

Figure 6:
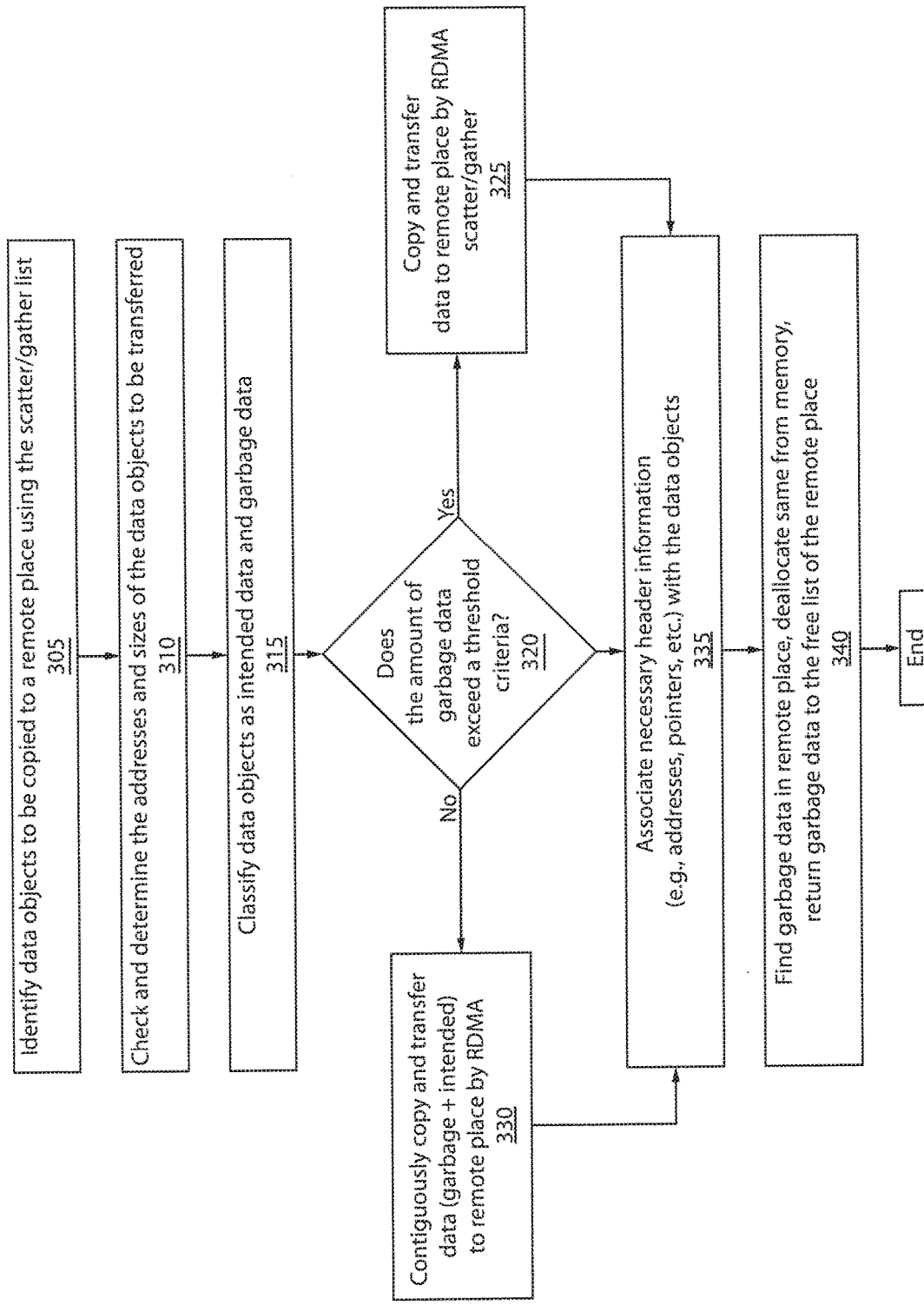
FIG. 6 shows an exemplary method for transferring data by RDMA in accordance with an embodiment of the present principles.

Further, it is to be appreciated that processing system 100 may perform at least part of the method described herein including, for example, at least part of method 300 of FIG. 6. Similarly, part or all of system 200 may be used to perform at least part of method 300 of FIG. 6.

System 200 is shown with respect to an operational environment in which it can be utilized, in accordance with an embodiment of the present principles. System 200 preferably includes a RDMA data transfer system 202 that includes one or more processors 204 and memory 206 for storing applications, modules and other data. In one embodiment, the memory unit 206 includes a large number of memory blocks. The system 200 may also include one or more displays 206 for viewing content. The display 206 may permit a user to interact with the system and its components and functions. This may be facilitated by the inclusion of a user interface 208, which may include a mouse, joystick, or any other peripheral or control to permit user interaction with the system and/or its devices. It should be understood that the components and functions of the system may be represented as one or more discrete systems or workstations, or may be integrated as part of a larger system or workstation.

System 200 is depicted as a computer-implemented approach to transferring data from a local place to a remote place using the scatter/gather RDMA protocol, resulting in faster processing time, lower system latency and more efficient use of memory space. This is particularly true in implementing the combined transfer approach in accordance with an embodiment of the present principles, where, e.g., a combination of copying and transferring a contiguous block including intended data and garbage data and copying and transferring only intended data by scatter/gather takes place.

System 200 receives input 210, which may include data and data objects in a memory array found in a local place 212 that are to be copied and transferred to a remote place 230. Input further may further include information about the data being transferred, such as for example the address headers of the data stored in the memory blocks of the local place 212.

The RDMA copy/transfer system 202 includes a logical and physical address mapping module 214; a data array size determiner 216; a RDMA copy/transfer unit 218 configured as a header writing unit 220, a scatter/gather copy/transfer unit 222, and contiguous data copy/transfer unit 224.

The logical and physical address mapping module 214 maps the logical and physical addresses of the data stored in the local place 212. The logical and physical address mapping module 214 further determines the size of the data array stored in the memory of the local place 214. This information is forwarded as output 228 to the remote place 230 to where data is being copied and transferred.

The data array size determiner 216 receives the information concerning the size of the data stored in the memory blocks of the local place 212. In one embodiment, the data array size determiner 216 uses information from the logical and physical address mapping module 214 to identify: the intended data and the unintended garbage data; the total size of the data in the array; the amount of garbage data; and, either directly or indirectly, the amount of intended data. Using this information, the data array size determiner 216 determines the data that should be copied sent contiguously, e.g., a data portion that includes intended data and garbage data that will be added to the scatter/gather list, and which data is only intended data that should be copied and sent by the scatter/gather input/output protocol of RDMA.

In one embodiment, the data array size determiner 216 makes the determination by applying threshold criteria relating to the size of the garbage data. As indicated above, the criteria may be based the total size of the garbage data, e.g., less than or equal to 100 kb. In another embodiment, the criteria may be based on a proportional amount of the garbage data, e.g., the garbage data is less than or equal to 10% of the total amount of data. The data array size determiner 216 provides the results of the determination to the RDMA copy/transfer unit 218. The data array size determiner 216 instructs the contiguous data copy/transfer unit 224 to copy and send a contiguous data portion including intended data and garbage data when the amount of garbage is below the threshold criteria. The data array size determiner 216 instructs the scatter/gather copy/transfer unit 222 to copy and send only intended data by the scatter/gather input output procedure of the RDMA protocol when the amount of garbage is above the threshold criteria. The criteria may be sent by a default setting in the data array size determiner 216, or it may be a user implemented value or values.

Data that is sent contiguously, e.g., a data portion that includes intended data and garbage data that is contiguously sent, is transmitted as output 228 to the remote place 230 by the contiguous data transfer unit 226. Intended data only that is sent by the scatter/gather input/output protocol of RDMA is transmitted as output 228 to the remote place 230 by the scatter/gather transfer unit 224. In one embodiment, the scatter/gather transfer unit controls the scatter/gather list in which the data to be copied and transferred is added to the list.

The remote place 230 receives the data sent by the contiguous data transfer unit 224 and by the scatter/gather data transfer unit 222 as output. Remote place 230 further receives as output the header information for the data that is sent by the header writing unit 220. The header information for the transferred data is written in the memory blocks of the remote host in order to align with the remote place execution environment. This includes the fulfillment of class pointers and clearing of lock words in the remote place. If the local place and the remote place have the same memory layouts, then the setting of class pointers may not be necessary.

A memory array deallocator is provided in the remote place 230. The memory array deallocator 230 returns the garbage data transferred contiguously to the remote place 230 to a free list of the remote place, freeing the memory blocks containing garbage data to receive other data.

The above embodiment of system 200 is merely exemplary. Variations of this embodiment and other embodiments altogether that implement the present principles are within the scope of the present disclosure. For example, the scatter/gather copy transfer unit and the contiguous data copy/transfer unit can be combined into a single copy transfer unit. Similarly, the scatter/gather list can be controlled by this combined unit, it can be controlled by a dedicated unit (e.g., scatter/gather list controller unit), or it could be controlled by one or both of the scatter/gather copy transfer unit and the contiguous data copy/transfer unit. Likewise, the functions of one or more of the aforedescribed units and modules can be combined into one or more of the other units and modules.

Referring to FIG. 6, an exemplary method 300 of a RDMA-based method to transfer arrays of objects including garbage data, in accordance with an embodiment of the present principles, is described. Part or all of method 300 may be performed by system 200 of FIG. 5.

In block 305, data objects to be copied to a remote place are identified using the scatter/gather list.

In block 310, the addresses and sizes of the data objects to be transferred are checked and determined. This is done using the scatter/gather list.

In block 315, the data objects are classified as intended data and unintended data. The unintended data is garbage data. For example, if the programming language is X10, an X10 object that is allocated in memory contains a reference to other data (such as a different object and class), the data is unintended data and therefore is garbage data.

Block 320 is a decision block in which the amount of garbage in the data objects to be copied and transferred by the RDMA protocol to a remote place is compared to a threshold criteria. The threshold criteria may be the total size of the garbage data, e.g., less than or equal to 100 kb of garbage found in a data object block. In another embodiment, the criteria may be based on a proportional amount of the garbage data, e.g., the garbage data is less than or equal to 10% of the total amount of the data object block. When the amount of garbage is above the threshold criteria, proceed to block 325. When the amount of garbage is below the threshold criteria, proceed to block 330.

In block 325, only the intended data is copied and transferred from a local place to a remote place using scatter/gather input/output procedure of the RDMA protocol by adding the data to the scatter/gather list. The scatter/gather data is written into the memory blocks of the remote place.

In block 330, data that includes intended data and garbage data is copied and transferred contiguously from a local place to a remote place by adding the data to the scatter/gather list. This data may be added to the byte stream for transfer to the remote place. The contiguous data is written into the memory blocks of the remote place.

In block 335, the intended header information (e.g., addresses, pointers, etc.) are written and associated with the data objects. Lock words are cleared. The establishment of new pointers may not be a required action if the memory layout of the local place and the remote place are the same.

In block 340, the garbage data copied and transferred to the remote place is located in the remote place memory blocks. In the remote place, the data is analyzed to find the garbage data is deallocated from memory and the garbage data is returned to the free list of the remote place, freeing the memory block holding the garbage data to receive other data.

In block 345, the procedure terminates.

The RDMA-based method to transfer arrays of objects including garbage data offers several advantages, such as, e.g.:

By using a combination of contiguous data transfer and scatter/gather data transfer, the number of entries on the scatter/gather list is less than if scatter/gather directed to transferring only intended data was the only data transfer mode. Keeping the scatter/gather list short (e.g., less entries) is desirable because the computer system performance may degrade when scatter/gather is used frequently;

The elapsed time of data transfer is reduced when contiguous data transfer including the transfer of garbage data is used in combination with scatter/gather; and Higher throughput is realized, e.g., the number of data objects processed over a selected time period is significantly greater.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
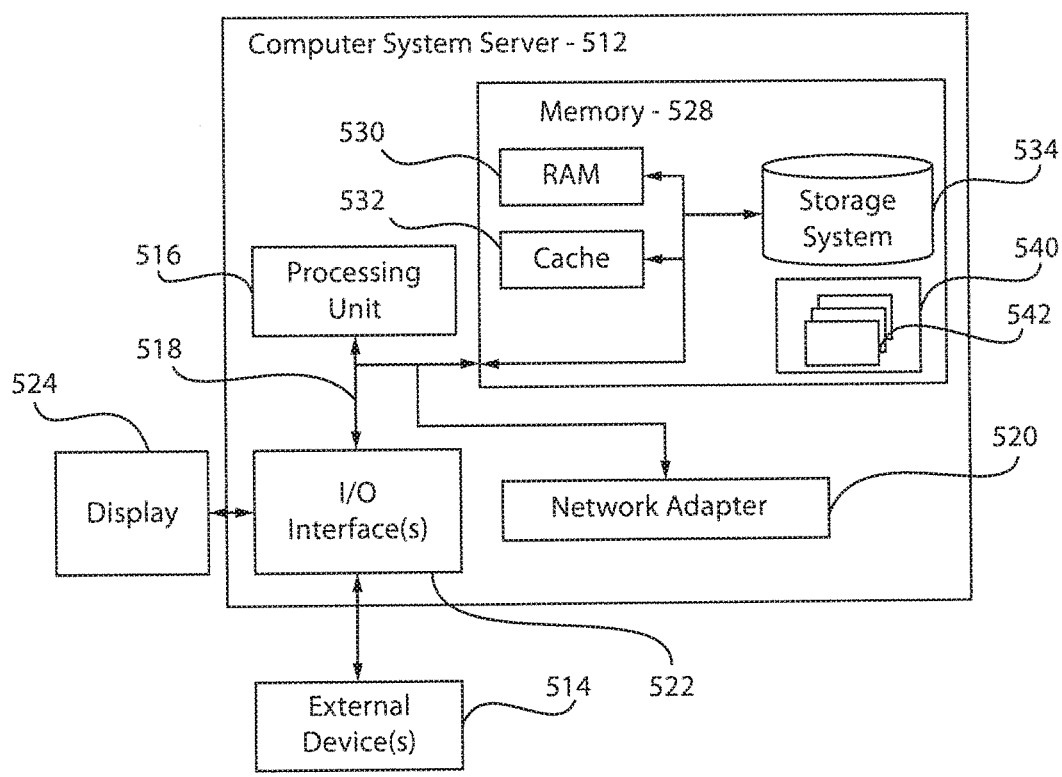
FIG. 7 shows an exemplary cloud computing node in accordance with an embodiment of the present principles.

Referring now to FIG. 7, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Figure 8:
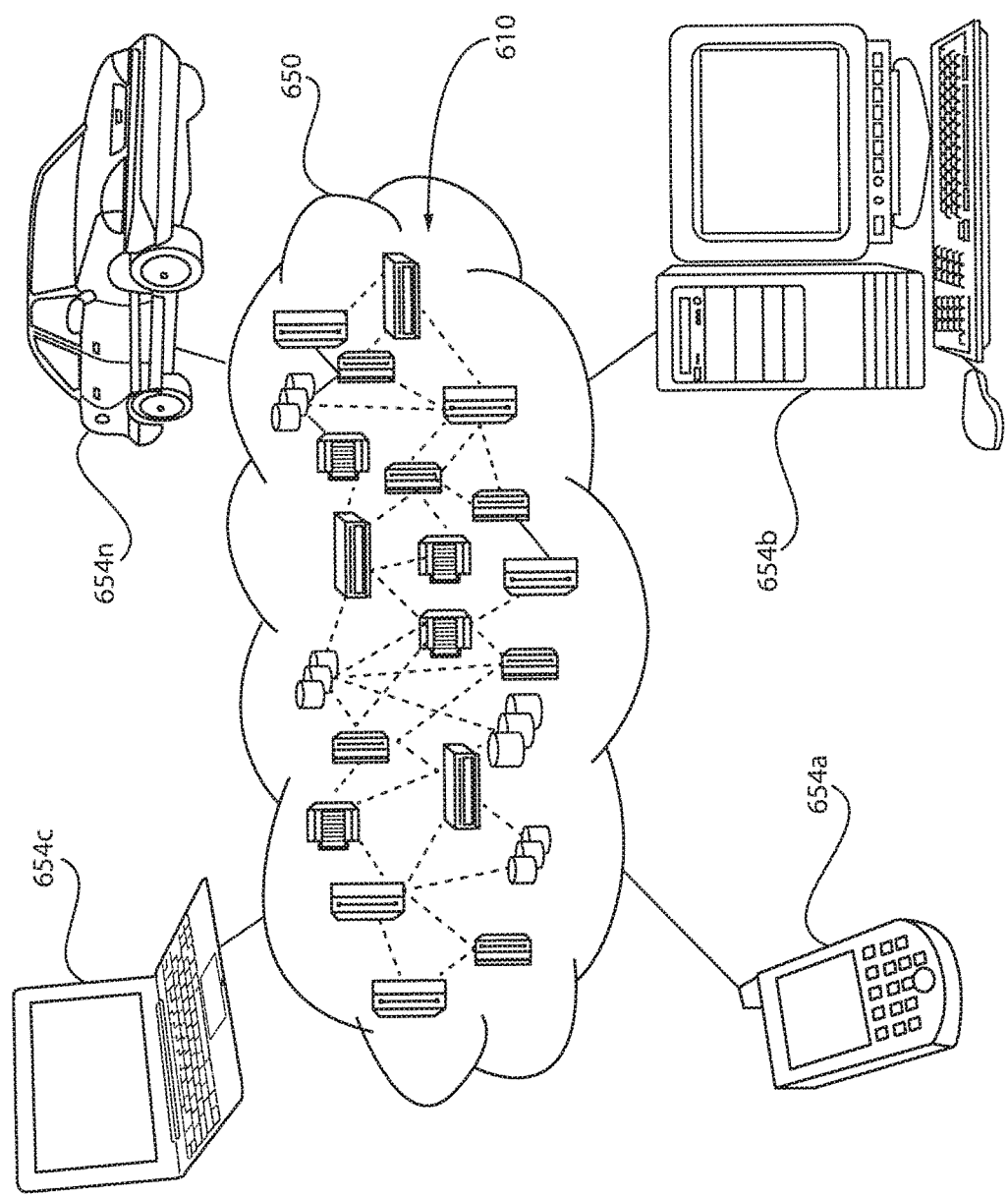
FIG. 8 shows an exemplary cloud computing environment in accordance with an embodiment of the present principles.

Referring now to FIG. 8, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 8 are intended to be illustrative only and that computing nodes 610 and cloud computing environment 650 can communicate with any type of computerized device over any type of network and/or network addressable connection (e.g., using a web browser).

Figure 9:
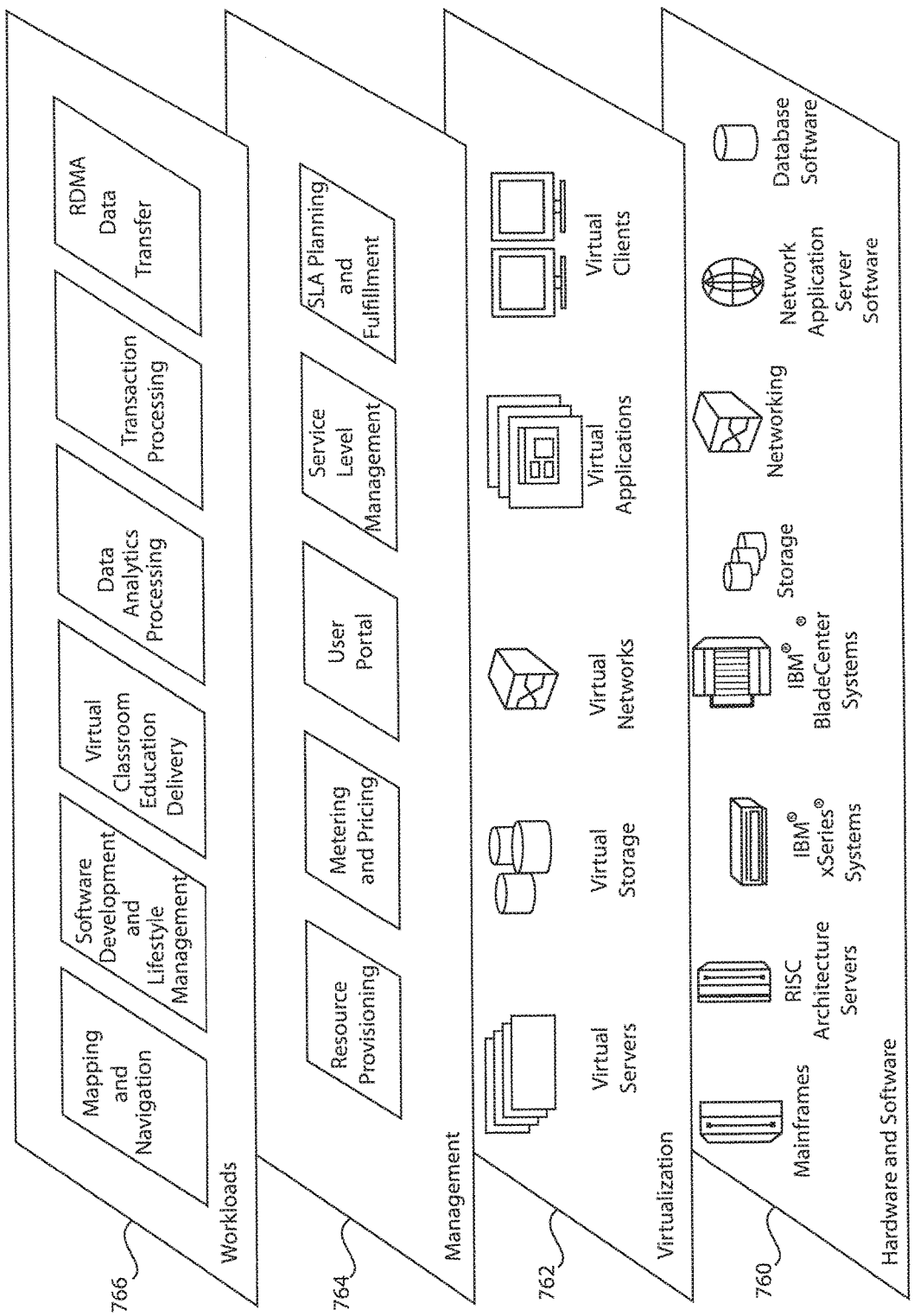
FIG. 9 shows exemplary abstraction model layers, in accordance with an embodiment of the present principles.

FIG. 9 shows a set of functional abstraction layers provided by cloud computing environment 650. It should be understood in advance that the components, layers, and functions shown in FIG. 14 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and RDMA transfer of data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of RDMA-based transfer of arrays of objects including garbage data, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for transferring data by remote data memory access resulting in faster data transfer speeds, comprising:

determining an amount of garbage data of data information in a selected data portion, and comparing the amount of garbage data to a threshold amount;

in response to the amount of garbage data being below the threshold amount, copying a first portion of data that includes intended data of the data information and the garbage data to a remote place;

in response to the amount of garbage data exceeding the threshold amount, copying a second portion of data that includes only the intended data to the remote place by a scatter/gather input/output method of a remote data memory access protocol; and returning the copied data to a free list of the remote place;

wherein at least a portion of the steps of the method are implemented by a hardware processor.

2. The method of claim 1, further comprising creating a remote data memory access scatter/gather list that manages the copying to the remote place in a bit stream that includes the first portion of data and the second portion of data.

3. The method according to claim 1, further comprising associating headers with the copied data.

4. The method of claim 3, wherein the headers include at least one of addresses and data pointers relating to the copied data.

5. The method of claim 1, wherein the garbage data includes unintended data that references other data lacking use in the remote place.

6. The method according to claim 1, wherein the copying is initiated with an at statement associated with the X10 computer language.

7. The method of claim 1, wherein the data information includes data objects and the intended data and the garbage data include respective portions of the data objects.

8. The method of claim 1, wherein the threshold amount is determined based on a total amount of garbage data in the selected data portion.

9. The method of claim 1, wherein the threshold amount is determined based on a proportional amount of garbage data in the selected data portion.

10. The method of claim 1, further comprising:
identifying the data information in data arrays in a local place;
determining addresses and sizes of the data information; and
classifying contents of the data information as the intended data and as the garbage data.

11. The method of claim 10, further comprising employing a remote data memory access scatter/gather list to map the addresses and the sizes of the data to be copied to the remote place.

12. A system for transferring data by remote data memory access resulting in faster data transfer speeds, comprising:
one or more processors operatively coupled to a memory including program code to:
determine an amount of garbage data of data information in a selected data portion, and compare the amount of garbage data to a threshold amount;
in response to the amount of garbage data being below the threshold amount, copy a first portion that includes intended data of the data information and the garbage data to a remote place;
in response to the amount of garbage data exceeding the threshold amount, copy a second portion that includes only the intended data to the remote place by a scatter/gather input/output method of a remote data memory access protocol; and
return the copied data to the remote place to a free list of the remote place.

13. The system of claim 12, further comprising program code to control a remote data memory access scatter/gather list that manages the copying to the remote place in a bit stream comprised of the first portion and the second portion.

14. The system of claim 12, further comprising program code to associate headers with the copied data, wherein the headers include addresses and data pointers relating to the copied data.

15. The system of claim 12, wherein the garbage data includes unintended data that references other data lacking use in the remote place.

16. The system of claim 12, wherein the threshold amount is determined based on a total amount of garbage data in the selected data portion.

17. The system of claim 12, wherein the threshold amount is determined based on a proportional amount of garbage data in the selected data portion.

18. The system of claim 12, further comprising program code to:
identify the data information in data arrays in a local place;
determine addresses and sizes of the data information; and
classify contents of the data information as the intended data and as the garbage data.

19. The system f claim 18, further comprising program code to employ a remote data memory access scatter/gather list to map the addresses and the sizes of the data to be copied to the remote place.

20. A computer program product for transferring data by remote data memory access resulting in faster data transfer speeds, the computer program product comprising a non-transitory computer readable storage medium having program instructions embodied therewith, the program instructions being executable by a computer to cause the computer to perform a method comprising:
determining an amount of garbage data of data information in a selected data portion, and comparing the amount of garbage data to a threshold amount;
in response to the amount of garbage data being below the threshold amount, copying a first portion of data that includes intended data of the data information and the garbage data to a remote place;
in response to the amount of garbage data exceeding the threshold amount, copying a second portion of data that includes only the intended data to the remote place by a scatter/gather input/output method of a remote data memory access protocol; and
returning the copied data to a free list of the remote place.

* * * * *